United States Patent
Maekawa

(10) Patent No.: US 9,319,582 B2
(45) Date of Patent: Apr. 19, 2016

(54) IMAGING DEVICE AND IMAGE PROCESSOR CONFIGURED TO PROCESS AN OBJECT REGION

(75) Inventor: Naoya Maekawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 368 days.

(21) Appl. No.: 13/535,351

(22) Filed: Jun. 27, 2012

(65) Prior Publication Data
US 2013/0002899 A1    Jan. 3, 2013

(30) Foreign Application Priority Data
Jun. 28, 2011   (JP) .................... 2011-142567

(51) Int. Cl.
H04N 5/228    (2006.01)
H04N 5/232    (2006.01)

(52) U.S. Cl.
CPC ....... H04N 5/23216 (2013.01); H04N 5/23245 (2013.01); H04N 5/23293 (2013.01)

(58) Field of Classification Search
CPC .......... H04N 5/23245; H04N 5/23216; H04N 5/23293
USPC ...................................... 348/222.1
See application file for complete search history.

(56) References Cited

U.S. PATENT DOCUMENTS

| | | | |
|---|---|---|---|
| 5,678,066 A * | 10/1997 | Sato ................. | 396/51 |
| 6,753,917 B2 | 6/2004 | Tanizoe et al. | |
| 7,714,892 B2 | 5/2010 | Clark, II et al. | |
| 8,045,047 B2 | 10/2011 | Nikkanen et al. | |
| 2004/0041919 A1* | 3/2004 | Yamanaka ................. | 348/222.1 |
| 2006/0104523 A1* | 5/2006 | Suzuki ......................... | 382/232 |
| 2006/0257128 A1 | 11/2006 | Ishito et al. | |
| 2006/0290796 A1 | 12/2006 | Nikkanen et al. | |
| 2008/0278618 A1* | 11/2008 | Matsumoto et al. .......... | 348/345 |
| 2009/0021633 A1 | 1/2009 | Fukumoto et al. | |

(Continued)

FOREIGN PATENT DOCUMENTS

| | | |
|---|---|---|
| JP | H11-055560 A | 2/1999 |
| JP | 2001-251540 A | 9/2001 |

(Continued)

OTHER PUBLICATIONS

Nikon Corp., Digital Camera D3000 Reference Manual, user's manual, p. 169.

(Continued)

Primary Examiner — Usman Khan
(74) Attorney, Agent, or Firm — Shinjyu Global IP

(57) ABSTRACT

Herein describes, by example, a digital image device comprising a CCD image sensor, a setting dial, a controller, and an image processor. The CCD image sensor captures a subject image and outputs image information. The setting dial accepts an input operation and outputs an operation signal including one that corresponds to the direction of the dial. The controller sets an object region that will be the object of a specific image processing process, so that at least one of a region direction and a region range for setting the object region can be changed according to an operation signal corresponding to the operation direction of the interface component. The image processor performs diorama filtering on the object region on the basis of the region direction and the region range.

4 Claims, 11 Drawing Sheets

(56) References Cited

U.S. PATENT DOCUMENTS

| | | |
|---|---|---|
| 2009/0290047 A1* | 11/2009 | Sogoh et al. ............. 348/240.99 |
| 2010/0149402 A1 | 6/2010 | Aoki et al. |
| 2010/0194851 A1 | 8/2010 | Pasupaleti et al. |
| 2010/0259647 A1 | 10/2010 | Gann |
| 2011/0043677 A1 | 2/2011 | Muramatsu et al. |
| 2011/0134311 A1 | 6/2011 | Nagao |
| 2011/0181602 A1* | 7/2011 | Boda et al. .................... 345/473 |
| 2011/0193984 A1 | 8/2011 | Kitaya et al. |
| 2014/0111669 A1 | 4/2014 | Nagao |

FOREIGN PATENT DOCUMENTS

| | | |
|---|---|---|
| JP | 2010-246033 A | 10/2010 |
| JP | 2011-010243 A | 1/2011 |
| JP | 2011-082726 A | 4/2011 |
| JP | 2011-120143 A | 6/2011 |
| JP | 2012-199690 A | 10/2012 |
| WO | 2009/116260 A1 | 9/2009 |

OTHER PUBLICATIONS

Canon Inc., IXY 400f Camera User Guide, user's manual, p. 58.
Office Action from the co-pending U.S. Appl. No. 13/535,287 issued on Jun. 11, 2014.
Office Action from the co-pending U.S. Appl. No. 13/535,287 issued on Dec. 19, 2014.

* cited by examiner

IMAGING DEVICE AND IMAGE PROCESSOR CONFIGURED TO PROCESS AN OBJECT REGION

CROSS-REFERENCE TO RELATED APPLICATIONS

This application claims priority under 35 U.S.C. §119 to Japanese Laid-Open Patent Application 2011-142567 filed on Jun. 28, 2011 is hereby incorporated herein by reference.

BACKGROUND

1. Technical Field

The present technology relates to an imaging device that images a subject and produces image information, and more particularly relates to an imaging device with which settings can be made for filtering applied to captured image information.

2. Background Information

With conventional imaging devices, the user can be given a visual effect that is as if a diorama (miniature) were captured, by subjecting part of the captured image to filtering, a type of image process, with a vignetting effect (called diorama filtering, etc.) (see for example Japanese Laid-Open Patent Application 2011-010243).

A diorama filter performs vignette processing on part of a screen, such as the left or right of the screen, or the top or bottom of the screen, when imaging subjects have a distance differential, etc. This diorama filtering allows a visual effect to be represented that simulates the capture of a diorama (a visual effect that makes it seem as if the imaged subject is smaller than it actually is). This visual effect is called a diorama filter effect (or miniature effect).

SUMMARY

With an imaging device equipped with a diorama filter like the one described above, it was necessary to perform numerous kinds of input operations to set the filter, but many users wished this operation could be performed more easily.

With some conventional diorama filters, the user can set the region in which vignette filtering is to be applied (or is not to be applied). A very common diorama filter setting is one in which the regions at the top and bottom of the screen are vignetted, while a band-like region crossing the middle is not vignetted. With this type of diorama filter, sometimes the thickness of the band-like region that is not vignetted can be set by a user. Setting the region for filtering, and setting the filtering width, are accomplished by operating a plurality of buttons, icons on a liquid crystal monitor, or the like. Accordingly, it was complicated for the user to set the filter.

The present technology was conceived in light of this problem, and it is one object of the present technology to provide an imaging device with which setting a filter can be made more convenient.

An imaging device disclosed herein includes an imaging component, an interface component, an object region setting component, and an image processor. The imaging component captures a subject image and outputs image information. The interface component accepts input operations and outputs an operation signal such as a signal corresponding to a direction of the interface component. The object region setting component sets a region as the object of a specific image processing process. The region includes a region direction and a region range for setting the first region. The object region setting component changes at least one of the region direction and the region range according to an operation signal corresponding to a first operation direction of the interface component. The image processor performs a specific image processing process on the object region on the basis of the region direction and the region range.

With the present technology, an imaging device is provided with convenient a convenient setting operation.

These and other objects, features, aspects and advantages of the present technology will become apparent to those skilled in the art from the following detailed description, which, taken in conjunction with the annexed drawings, discloses a portion of possible embodiments of the present technology.

BRIEF DESCRIPTION OF DRAWINGS

Referring now to the attached drawings, which form a part of this original disclosure.

DETAILED DESCRIPTION

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

A digital camera 100 in a first embodiment is capable of imaging in which a diorama filter effect is performed by a diorama filter. The digital camera 100 also includes the functions of displaying and setting the range over which a vignette effect is applied by the filter prior to imaging. The digital camera 100 performs imaging control on the basis of these functions and settings. The configuration and operation of the digital camera 100 will now be described.

Configuration

The configuration of the digital camera 100 will now be described with references the drawings.

1-1. Configuration of Digital Camera 100

Figure 1:
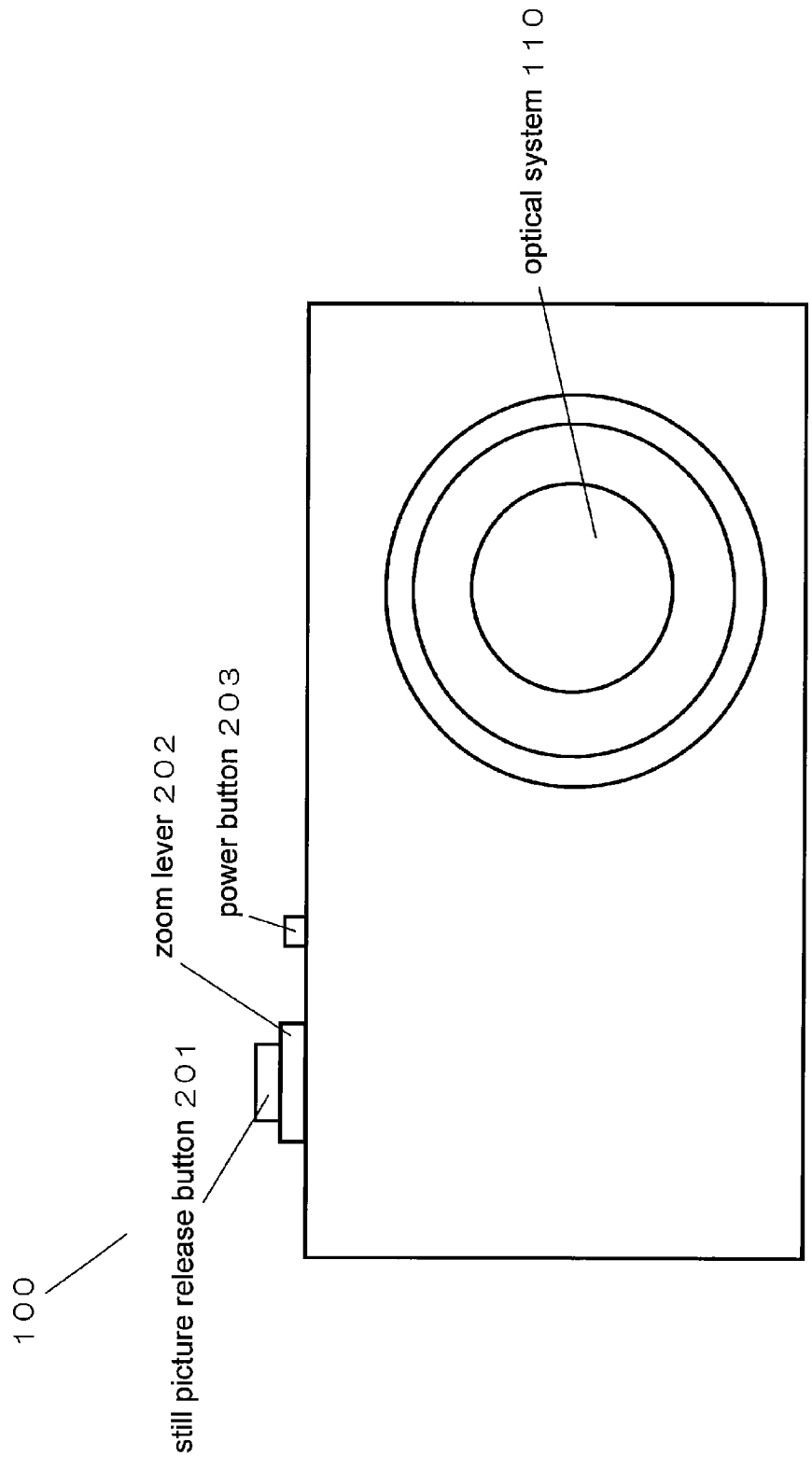
FIG. 1 is a diagram of the front face configuration of a digital camera 100 pertaining to the first embodiment.

FIG. 1 is a front configuration diagram of the digital camera 100. The front face of the digital camera 100 is provided with a lens barrel that contains an optical system 110. The top face of the digital camera 100 is provided with a still picture release button 201, a zoom lever 202, a power button 203, and other control buttons.

Figure 2:
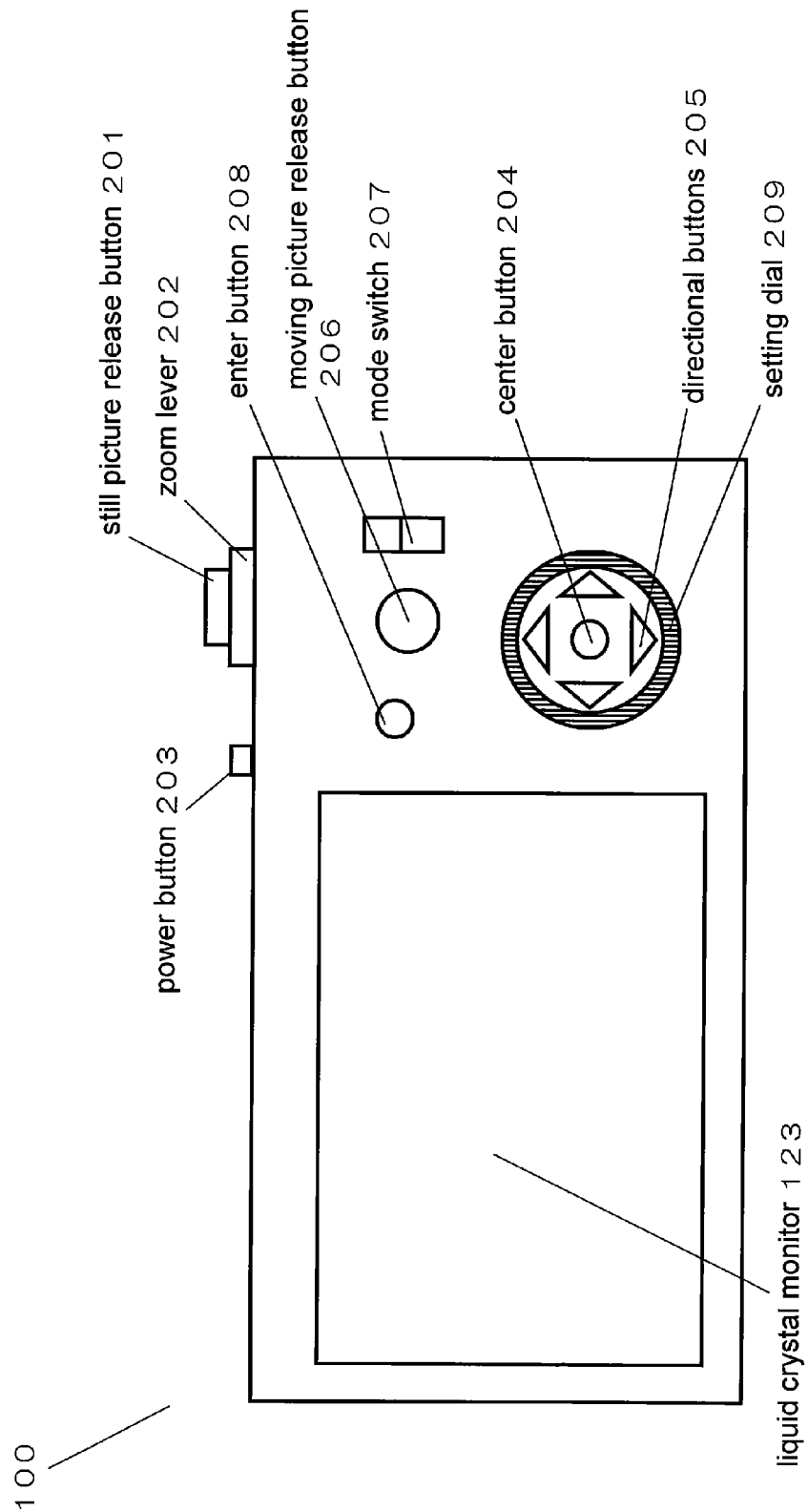
FIG. 2 is a diagram of the rear face configuration of a digital camera 100 pertaining to the first embodiment.

FIG. 2 is a rear configuration diagram of the digital camera 100. The rear face of the digital camera 100 includes a liquid crystal monitor 123, a center button 204, directional buttons 205, a moving picture release button 206, a mode switch 207, an enter button 208, and other control buttons.

Figure 3:
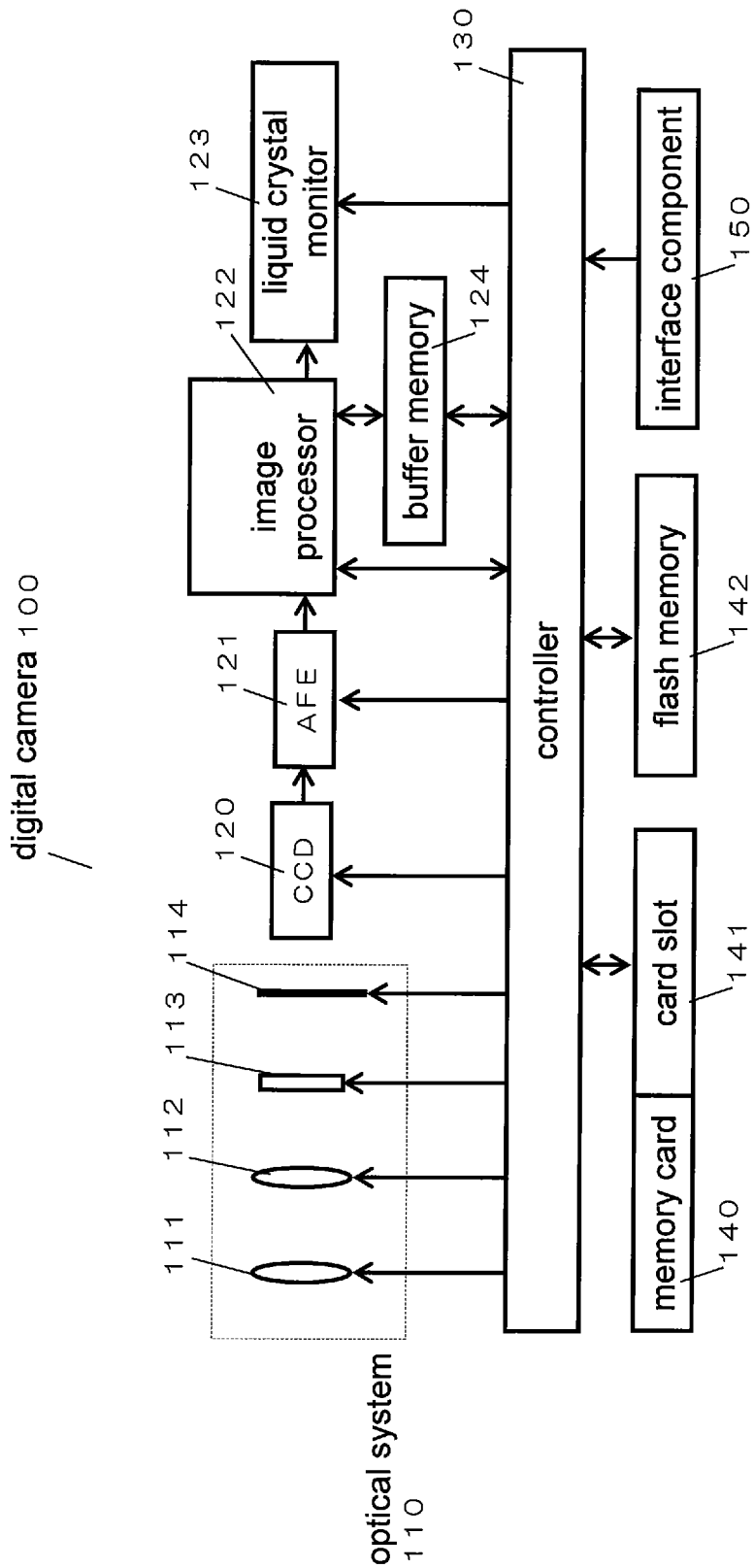
FIG. 3 is a diagram of the electrical configuration of a digital camera 100 pertaining to the first embodiment.

FIG. 3 is an electrical configuration diagram of the digital camera 100. The digital camera 100 uses a CCD image sensor 120 to capture a subject image formed by the optical system 110. The CCD image sensor 120 produces image information based on the captured subject image. The image information produced by the CCD image sensor 120 is subject to various kinds of processing by an AFE (analog front end) 121 and an image processor 122. The image information thus produced is recorded to a flash memory 142 or a memory card 140. The image information recorded to the flash memory 142 or the memory card 140 is displayed on the liquid crystal monitor 123 when the user operates an interface component 150. The configurations shown in FIG. 1 to FIG. 3 will now be described in detail.

The optical system 110 includes a focus lens 111, a zoom lens 112, an aperture 113, a shutter 114, and so forth. Although not depicted in the drawings, the optical system 110 may include an optical shake correcting lens OIS (optical image stabilizer). The various lenses that make up the optical system 110 may each consist of any number of lenses, and may each consist of any number of groups.

The focus lens 111 adjusts the focal state of the subject. The zoom lens 112 adjusts the image angle of the subject. The aperture 113 adjusts the amount of light incident on the CCD image sensor 120. The shutter 114 adjusts the exposure time of light incident on the CCD image sensor 120. The focus lens 111, the zoom lens 112, the aperture 113, and the shutter 114 are each driven by at least a corresponding DC motor, stepping motor, or other such drive means, according to a control signal sent from a controller 130.

The CCD image sensor 120 produces image information by capturing a subject image formed by the optical system 110. The CCD image sensor 120 produces a new frame of image information for any specific unit of time when the digital camera 100 is in imaging mode.

With the AFE 121, the image information read from the CCD image sensor 120 can be subject to noise suppression by correlated double sampling, amplification to the input range width of an A/D converter by an analog gain controller, and A/D conversion by an A/D converter. After this, the AFE 121 outputs the image information to the image processor 122.

The image processor 122 performs various kinds of image processing processes on the image information outputted from the AFE 121. Examples of image processing processes include smear correction, white balance correction, gamma correction, YC conversion processing, electronic zoom processing, extraction processing, compression processing, and expansion processing, but this list of image processing processes is not intended to be comprehensive.

The extraction processing referred to above includes processing in which all or part of the image information read from the CCD image sensor is cut out (extracted). The cutting range is decided according to the aspect ratio of the image information (moving or still picture) to be recorded. Information related to the aspect ratio of the image information to be recorded is recorded to the flash memory 142, and will be discussed below.

The image processor 122 stores the image information that has undergone various kinds of processing in a buffer memory 124. The image processor 122 may include a hardwired electronic circuit, or a microprocessor or the like in which a program is used. It may also include a single semiconductor chip along with a controller 130.

The liquid crystal monitor 123 is provided on the rear face of the digital camera 100. The liquid crystal monitor 123 displays an image based on the image information processed by the image processor 122. Images displayed on the liquid crystal monitor 123 include through-images and recorded images. A through-image is one in which images for new frames produced by the CCD image sensor 120 at specific time intervals are continuously displayed. Usually, when the digital camera 100 is in imaging mode, the image processor 122 produces a through-image from the image information produced by the CCD image sensor 120. The user can capture images while checking on the composition of the subject by referring to the through-image displayed on the liquid crystal monitor 123.

A recorded image in this embodiment is a high-resolution image recorded to the memory card 140 or another recording medium. A recorded image can be reduced to a lower resolution in order to be displayed on the liquid crystal monitor 123 when the digital camera 100 is in reproduction mode. The high-resolution image information recorded to the memory card 140 is produced by the image processor 122 on the basis of the image information produced by the CCD image sensor 120 after the user has operated the release button 201.

The controller 130 performs overall control over the operation of the entire digital camera 100. The controller 130 also records image information stored in the buffer memory 124 (after being processed by the image processor 122) to the memory card 140 or another recording medium. The controller 130 may include a CPU, or a similar device that processes various kinds of information by executing a program, and a ROM that holds programs and other such information. The ROM holds programs for overall control of the entire digital camera 100, as well as for file control, auto-focus control (AF control), and auto-exposure control (AE control).

The controller 130 may include a hard-wired electronic circuit, or a microprocessor or the like. It may also include a single semiconductor chip along with the image processor 122, etc. Also, a ROM need not be built into the interior of the controller 130, and may instead be provided outside of the controller 130.

The buffer memory 124 is a memory means which may function as a working memory for the controller 130 and the image processor 122. The buffer memory 124 may include a DRAM (dynamic random access memory) or the like. Also, the flash memory 142 may function as an internal memory for recording image information, setting information, and so forth.

Examples of setting range information (setting information regarding imaging with a diorama filter) include a direction flag (a flag indicating whether the direction is up and down or is left and right in the range over which vignette processing is not applied in the diorama filter), and a setting width value (information about the width of the range over which vignette processing is not applied. This setting range information will be discussed in detail below. In addition, setting information related to the diorama filter includes an on/off flag indicating whether or not to apply a diorama filter effect to image information that is recorded to, or in, the flash memory 142.

The card slot 141 includes a connection means that allows the memory card 140 to be inserted and removed. The card slot 141 allows the memory card 140 to be electrically and mechanically connected. The card slot 141 may also control the memory card 140.

The memory card 140 is an external memory equipped with an internal flash memory or other such recording component. The memory card 140 records image information or other such data processed by the image processor 122.

The interface component 150 is the collective name for the interface buttons and dials which are provided to the outside of the digital camera 100 and operated by the user. For example, this corresponds to the still picture release button 201, moving picture release button 206, zoom lever 202, power button 203, center button 204, directional buttons 205, mode switch 207, enter button 208, setting dial 209, and so forth shown in FIGS. 1 and 2. The interface component 150 sends the controller 130 various operational command signals when operated by the user. The controller 130 controls the various components according to the operational command signals.

The still picture release button 201 is a two-stage button that can be pressed half-way down or all the way down. When the user presses the still picture release button 201 half-way down, the controller 130 executes AE (auto-exposure) control and/or determines the imaging conditions. When the user then presses the still picture release button 201 all the way down, the controller 130 performs imaging capturing. The controller 130 records the image information captured at the point when the button was pressed all the way down, as a still picture to the memory card 140, etc. Hereinafter, when it is simply stated that the still picture release button 201 is pressed, it shall mean that the button is pressed all the way down.

The moving picture release button 206 is a push button for starting and stopping moving picture recording. When the moving picture release button 206 is pressed by the user, the controller 130 successively records the image information produced by the image processor 122, on the basis of the image information produced by the CCD image sensor 120, as a moving picture to the memory card 140 or other recording medium. When the moving picture release button 206 is pressed again, recording of the moving picture ends.

The zoom lever 202 is type of lever that automatically returns to the center position, and is used to adjust the field angle between the wide angle end and the telephoto end. The zoom lever 202 sends the controller 130 an operational command signal to drive the zoom lens 112 when operated by the user. Specifically, when the zoom lever 202 is operated to the wide angle end side, the controller 130 drives the zoom lens 112 so that the subject is captured at a wide angle. Similarly, when the zoom lever 202 is operated to the telephoto end side, the controller 130 drives the zoom lens 112 so that the subject is captured at telephoto.

The power button 203 is a push button used for switching the power on and off to the various components constituting the digital camera 100. When the power button 203 is pressed by the user while the power is off, the controller 130 supplies power to the various components constituting the digital camera 100, and actuates them. When the power button 203 is pressed by the user while the power is on, the controller 130 stops the supply of power to the various components.

The center button 204 is a push button. When the user presses the center button 204 while the digital camera 100 is in imaging mode or reproduction mode, the controller 130 displays a menu screen on the liquid crystal monitor 123. The menu screen is used to set the various conditions for imaging and reproduction, and allows settings to be made such as switching a shutter sound on or off, and switching the diorama filter on or off. The information set on the menu screen is recorded to the flash memory 142. When the center button 204 is pressed while a setting category for one of the various conditions has been selected, it also functions as an enter button.

The directional buttons 205 are push buttons provided in the up, down, left, and right directions. The user presses the directional buttons 205 in one of these directions to select one of the various condition categories displayed on the liquid crystal monitor 123.

The mode switch 207 is a push button provided in the up and down directions. The user presses the mode switch 207 in one of these directions to switch the state of the digital camera 100 between imaging mode and reproduction mode.

The enter button 208 is a push button that is pressed when setting a diorama filter effect for obtaining a diorama filter effect. When the enter button 208 is pressed in the standby state of the imaging mode, in which the diorama filter effect is switched on, the controller 130 displays a screen on the liquid crystal monitor for setting the filter effect of the diorama filter. The filter effect setting will be discussed in detail below.

The setting dial 209 can sense rotation in the left and right directions. The setting dial 209 is disposed so as to surround the center button 204 and the directional buttons 205 so that it can rotate in the same plane as the rear face of the digital camera 100. The setting dial 209 is rotated to make selections in the setting of the various conditions on the menu displayed on the liquid crystal monitor 123 by pressing the center button 204 or the enter button 208.

1-2. Correspondence with the Present Technology

The CCD image sensor 120 is an example of an imaging component. The controller 130 is an example of an object region setting component.

The direction for setting the object region of diorama processing is an example of the region direction. The up and down direction is an example of a first region direction. The left and right direction is an example of a second region direction.

Operation 2-1. Switching Diorama Filter Effect on and Off in Digital Camera 100

The switching of the diorama filter effect on and off in the digital camera 100 will now be described. When the digital camera 100 has been put in imaging mode by operation of the mode switch 207, and the user presses the center button 204, the controller 130 displays a menu screen on the liquid crystal monitor 123.

The menu screen is used to set the various conditions for imaging and/or reproduction. The user operates the directional buttons 205 or the setting dial 209 to call up a setting menu for switching the diorama filter effect on or off, and sets the diorama filter effect to be either on or off. The on/off setting of the diorama filter effect is recorded as a diorama on/off flag to the flash memory 142.

The controller 130 refers to the on/off flag recorded to the flash memory 142 to decide the current setting, that is, whether or not the diorama filter effect is on. If the filter has been set, this result (on or off) is recorded as an on/off flag to the flash memory 142. If the filter has been set to on, the diorama filter effect is applied to image information captured in imaging mode. The effect setting operation and imaging operation when the diorama filter effect is on will be described below.

2-2. Diorama Filter Setting and Imaging Operation in Digital Camera 100

Figure 4:
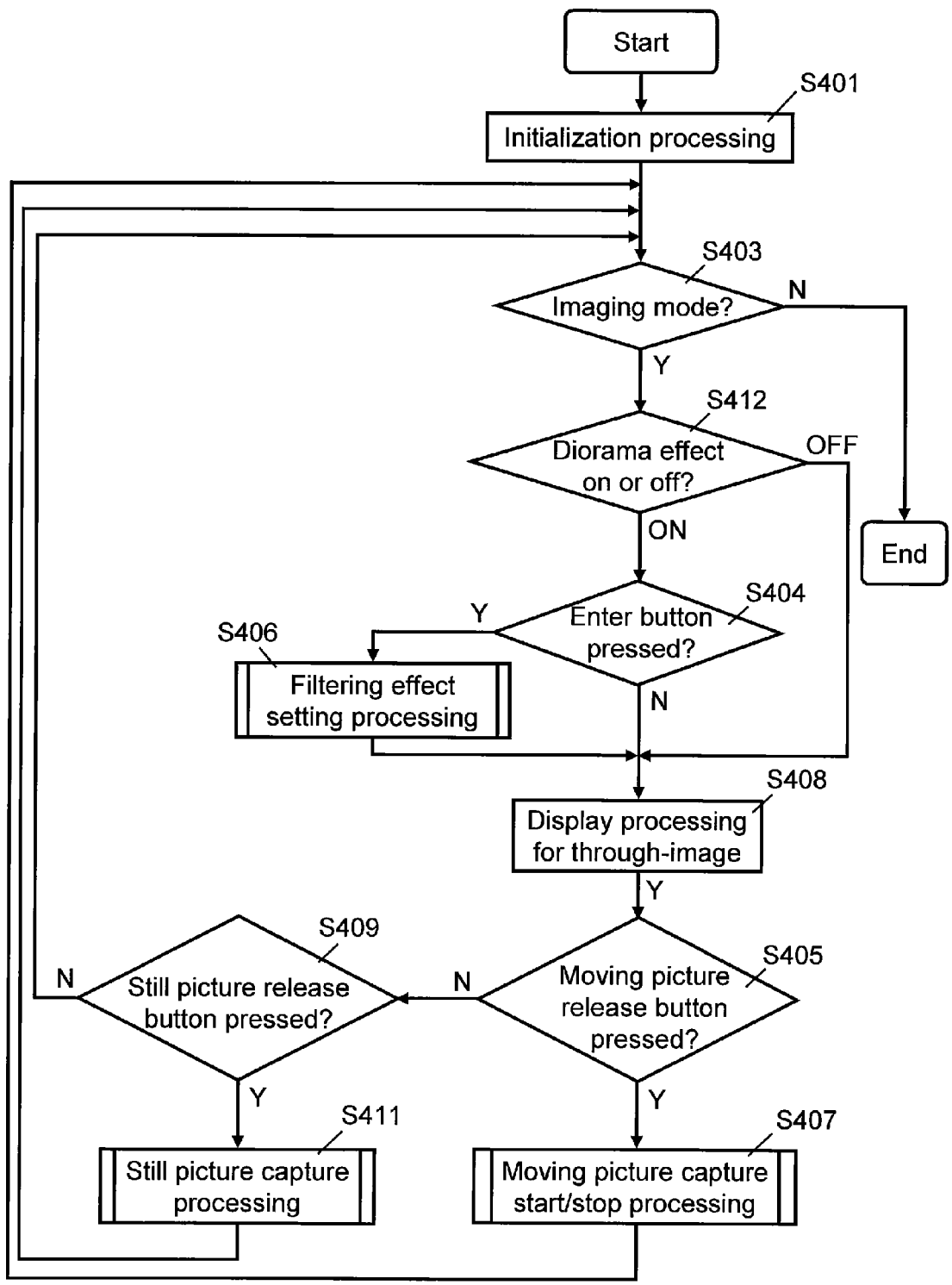
FIG. 4 is a flowchart of the flow of processing in the imaging mode pertaining to the first embodiment.

First, the imaging control of the digital camera 100 will be described. FIG. 4 is a flowchart of imaging control when the digital camera 100 is in imaging mode. The digital camera 100 is configured to capture both moving pictures and still pictures in imaging mode.

When the digital camera 100 has been put in imaging mode by operation of the mode switch 207 by the user, the controller 130 switches the operation of the entire digital camera 100 to imaging mode. In imaging mode, the controller 130 first performs the initialization processing necessary for still picture and/or moving picture recording (S401).

Once initialization is complete, the controller 130 repeats setting processing and display processing corresponding to input from the user. These processing steps include checking the state of the mode switch 207 (S403), checking whether the diorama filter effect is on or off (S412), monitoring the pressing of the enter button 208 (S404), filter effect setting processing (S406), displaying a through-image (S408), monitoring the pressing of the moving picture release button 206 (S405), and monitoring the pressing of the still picture release button 201 (S409).

In S403, if the state of the mode switch 207 is in imaging mode (Yes at S403), the controller 130 executes at least one of the above-mentioned processing steps of S412, S404, S406, S408, S405, and S409. In S403, if the state of the mode switch 207 is not in imaging mode (No at S403), the processing of imaging mode is ended. In S412, if the diorama filter effect is not on, the processing of S408 is executed.

The controller 130 monitors the pressing of the enter button 208 in S404, and if the enter button 208 has been pressed, the mode moves to setting mode, and filter effect setting processing is performed (S406). If the user presses the setting dial 209 here, the diorama filter effect range is set. For example, the range over which to apply the effect (the effect range) is set by this operation. More specifically, the controller 130 sets the width of the effect range in the up and down direction and the left and right direction. After this, the controller 130 displays a through-image that has gone through the diorama filter on the basis of the setting value that has undergone filter effect setting processing (S408). This filter effect setting processing will be described in detail with references to FIG. 5. On the other hand, if the enter button 208 has not been pressed, the controller 130 does not perform setting processing for the diorama filter effect, and instead displays a through-image that has gone through the diorama filter at the current setting value (S408).

In step S405, if it is detected that the moving picture release button 206 has been pressed, the controller 130 performs moving picture capture start and/or stop processing (S407). In step S409, if the controller 130 detects that the still picture release button 201 has been pressed, still picture capture processing is performed (S411). Details of the moving picture capture start and stop processing will be described with references to the flowchart of FIG. 7. Details of the still picture capture processing will be described with references to the flowchart of FIG. 8.

Figure 5:
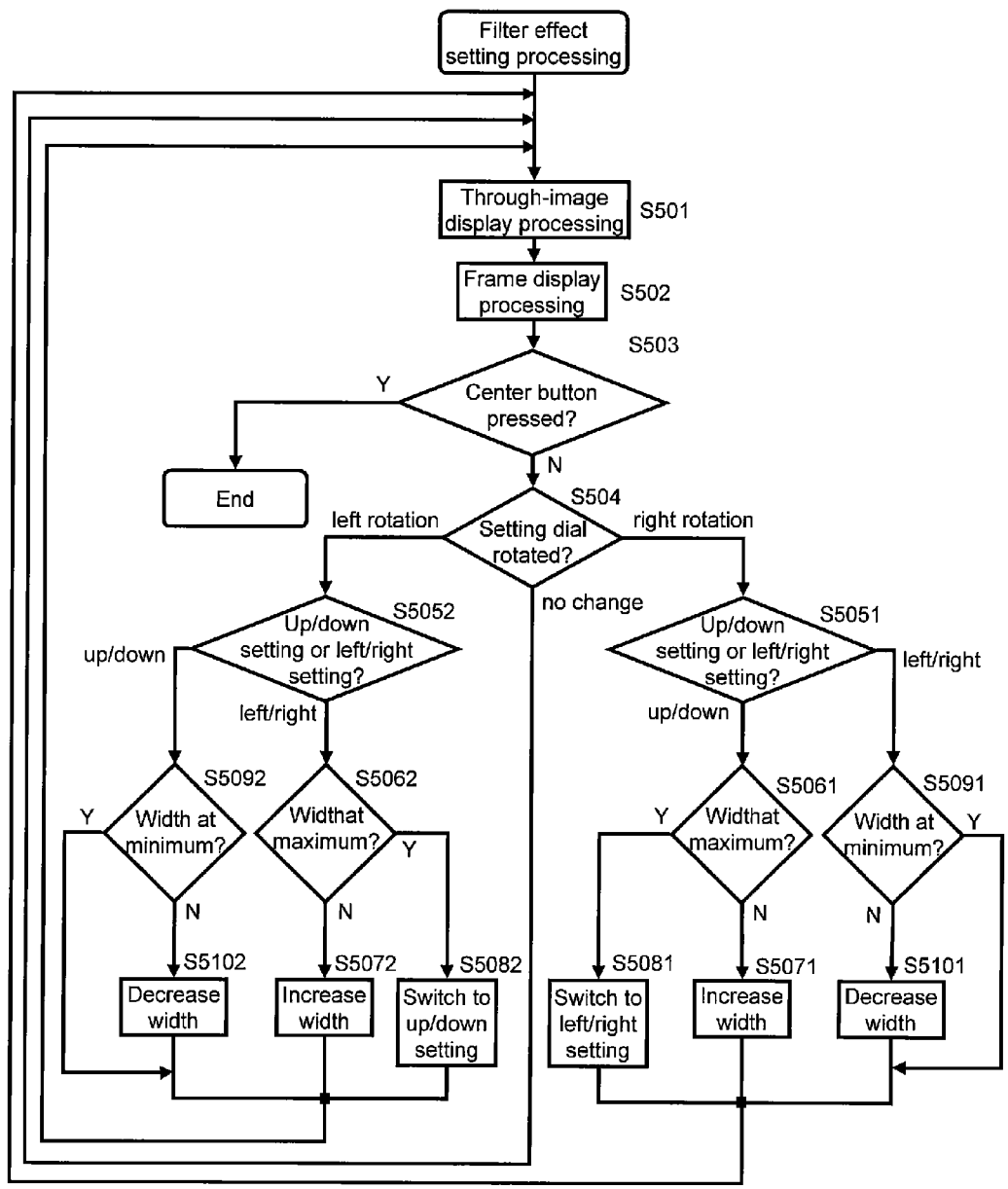
FIG. 5 is a flowchart of the flow of filter effect setting processing pertaining to the first embodiment.
Figure 6:
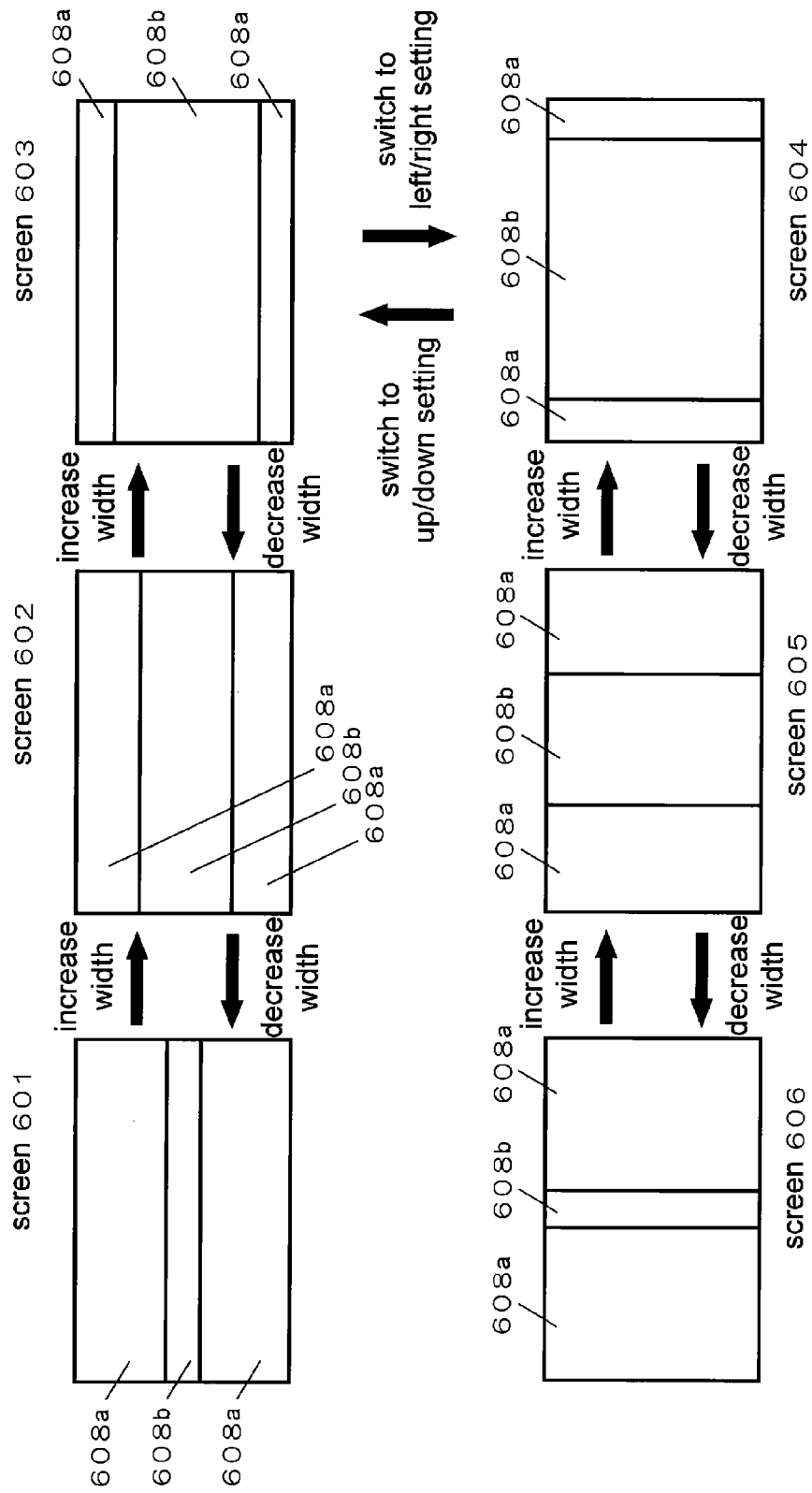
FIG. 6 is a diagram illustrating an example of a screen display during the filter effect setting pertaining to the first embodiment.

Next, the processing for setting the diorama filter effect 100 will be described. FIG. 5 is a flowchart of the flow of processing for setting the diorama filter effect. FIG. 6 is a diagram illustrating an example of a screen display during diorama filter effect setting. The controller 130 sets "up/down" and "minimum" as the initial values for the direction flag and the setting width, and starts setting processing for the diorama filter effect.

As discussed above, the direction flag is used to identify whether the direction of the range over which vignette processing is not applied in the diorama filter is "up/down" or "left/right." Here, "up/down" means that the degree of vignetting changes in the up and down direction of the screen. "Left/right" means that the degree of vignetting changes in the left and right direction of the screen. The setting width value is information about the width of the range over which vignette processing is not applied. In this embodiment, the setting width value is given as one of three stages: minimum, medium, and maximum.

In this embodiment, as shown by the screens 601 to 606 in FIG. 6, six different diorama filters can be achieved by combinations of the direction flag and the setting width value. Screens 601, 602, and 603 are examples of screen displays when the direction flag is "up/down." Screens 604, 605, and 606 are examples of screen displays when the direction flag is "left/right." Screens 601 and 606 are examples of screen displays when the setting width value is "minimum." Screens 602 and 605 are examples of screen displays when the setting width value is "medium." And screens 603 and 604 are examples of screen displays when the setting width value is "maximum."

For example, the screen 601 shows the status of the diorama filter effect setting when the direction flag is "up/down" and the setting width value is "minimum." In this case, the screen is divided in three in the up and down direction, with the upper and lower parts being ranges 608*a* over which vignette processing is performed, and the middle part in between these two parts being the range 608*b* over which vignette processing is not performed. When through-image display, still picture capture, and moving picture capture are performed, vignette processing is performed only in the range 608*a*.

The controller 130 first performs through-image display processing by controlling the image processor 122 (S501). Then, the controller 130 controls the image processor 122 to display a setting frame indicating the filter effect range on this through-image (S502). More specifically, this setting frame is a rectangular frame that surrounds the region 608*b* in which vignette processing is not applied. In other words, the image data of region 608*b* is unaltered during image processing. When the direction flag is "up/down" and the setting width value is "minimum", the setting frame is displayed as on the screen 601 in FIG. 6. The setting frame on the screen 601 in FIG. 6 is set such that its length in the left and right direction is equal to the screen width, and its length in the up and down direction is the shortest of the screens 601, 602, and 603.

If the center button 204 has not been pressed and the setting remains unchanged (No in S503), the controller 130 detects rotation of the setting dial 209 (S504). When the user turns the setting dial 209, this rotation is sensed, and processing to decide the filter effect range is started. If there is no change in rotation, the flow returns to the start of the processing.

For example, when the setting dial 209 is turned to the right, the controller 130 determines whether or not the direction flag of the filter effect range is "up/down" (S5051). Here, if the controller 130 determines that the direction flag is "up/down" (up/down in S5051), the setting width value of the filter effect range is increased in conjunction with the movement of the setting dial 209 (S5071). Consequently, the setting width of the filter effect range is expanded.

If, for example, the current direction flag is "up/down" and the setting width value is "minimum," that is, in the state of the screen 601, the controller 130 expands the setting width value by one level (No in S5061; S5071) and sets the setting width to "medium" (screen 602). If the setting width value has already reached "maximum" (Yes in S5061) (screen 604), the controller 130 changes the direction flag from "up/down" to "left/right," and the setting width value is maintained in its "maximum" state (S5081) (screen 604). On the other hand, if the controller 130 determines that the direction flag is "left/right" (left/right in S5051), and if the setting width value has not reached "minimum" (No in S5091), the controller 130 reduces the setting width value by one level and sets it to "medium" (S5101) (screen 603). If the direction flag is "left/right" and the setting width value is "minimum" when the setting dial 209 is turned to the right (Yes in S5091), the controller 130 does not change the setting any further (does nothing).

On the other hand if the setting dial 209 is turned to the left, the controller 130 determines whether or not the direction flag of the filter effect range is "left/right" (S5052). Here, if the controller 130 determines the direction flag to be "left/right," the setting width value of the filter effect range is increased in conjunction with the movement of the setting dial 209 (S5072) (screen 605). Consequently, the setting width of the filter effect range is expanded. If the setting width value has already reached "maximum" (S5062) (screen 604), the controller 130 changes the direction flag from "left/right" to "up/down." At this point the controller 130 maintains the setting width value in its "maximum" state (S5082) (screen 603). On the other hand, if the controller 130 determines that the direction flag is "up/down" (left/right in S5052), and if the setting width value has not reached "minimum" (S5092), the controller 130 reduces the setting width value by one level (S5102) (screen 602). If the direction flag is "up/down" and the setting width value is "minimum" when the setting dial 209 is turned to the left, the controller 130 does not change the setting any further (does nothing).

The above processing is repeatedly executed by the controller 130. These processing steps include through-image display processing (S501), setting frame display processing (S502), processing to confirm the pressing of the center button 204 (S503), processing to confirm the rotation of the setting dial (S504), and filter direction setting processing and setting width adjustment processing that follow S504. These repeated processing steps end once it is confirmed in S503 that the center button 204 has been pressed. Specifically, when the center button 204 is pressed, the setting mode ends. When the processing ends, the controller 130 records the direction flags and setting width values, which are setting range information set in the filter effect setting processing, to the flash memory 142.

Figure 7:
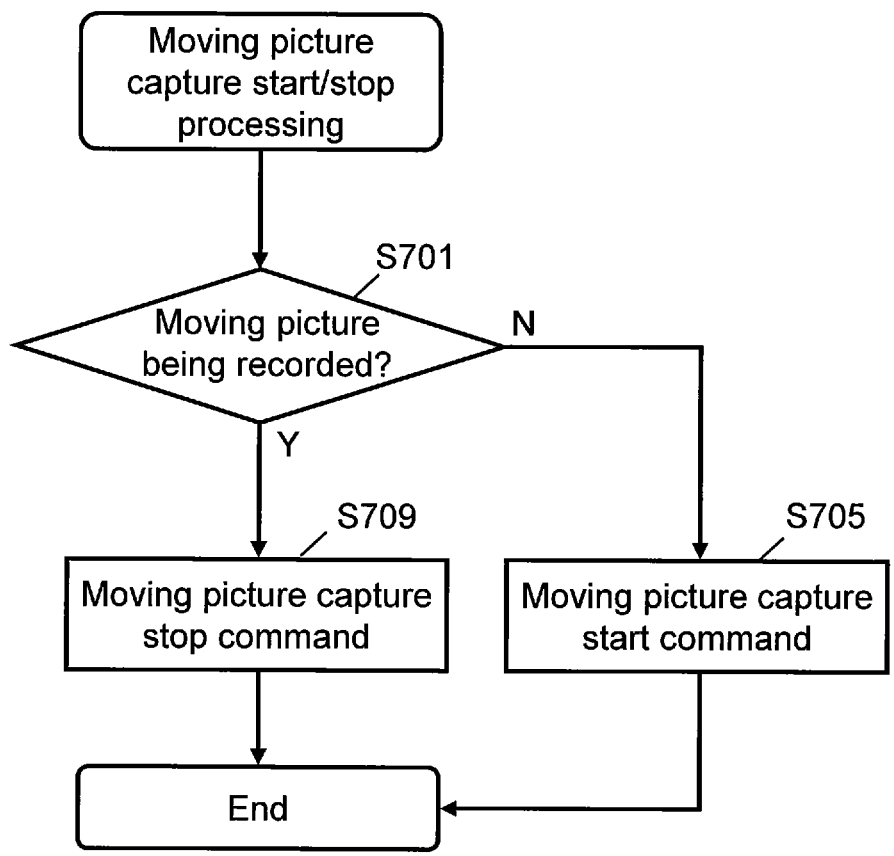
FIG. 7 is a flowchart of the flow of moving picture capture start/stop processing pertaining to the first embodiment.

FIG. 7 is a flowchart of the flow to start and stop moving picture capture processing. In moving picture capture start/stop processing, when it is detected that the user has pressed the moving picture release button 206, the controller 130 determines whether or not the digital camera 100 is in the midst of moving picture recording (S701). If the digital camera 100 is not in the midst of moving picture recording (No in S701), the controller 130 instructs the image processor 122 to start moving picture recording (S705). Upon receiving this command to start moving picture recording, the image processor 122 acquires setting range information for the diorama filter from the flash memory 142. The image processor 122 then starts recording the moving picture that has undergone diorama filtering over the acquired range. The diorama filter in this embodiment is one that serves as a low-pass filter with respect to the range 608a in which vignette processing is applied, and does not serve as a low-pass filter with respect to the range 608b in which vignette processing is not applied.

Then, the image information, which is produced by the image processor 122 on the basis of the image information produced by the CCD image sensor 120, is recorded successively as a moving picture to the memory card 140 or another such recording medium. This processing is executed from the point when the controller 130 instructs the image processor 122 to start moving picture recording until the controller 130 instructs the image processor 122 to stop moving picture recording.

At the start of recording, the image processor 122 acquires setting range information for the diorama filter from the flash memory 142. The image processor 122 then performs diorama filtering on the diorama filter setting range of the moving picture in the image information produced by the CCD image sensor 120. The image processor 122 then cuts out all or part of the image information that has undergone diorama filtering, and records this image information to the memory card 140 or another such recording medium. If the digital camera 100 is in the midst of recording operation (No at S701), the controller 130 instructs the image processor 122 to stop moving picture recording (S709).

Figure 8:
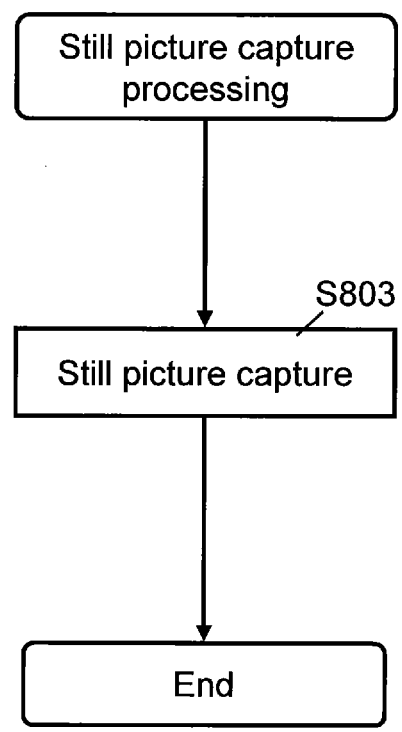
FIG. 8 is a flowchart of the flow of still picture capture processing pertaining to the first embodiment.

FIG. 8 is a flowchart of the flow of still picture capture processing. When it is detected that the user has pressed the still picture release button 201, the controller 130 records the still picture, which is produced by the image processor 122 on the basis of the image information produced by the CCD image sensor 120 at the point when the still picture release button 201 was pressed, to the memory card 140 or another such recording medium (S803). The image processor 122 acquires the diorama filter setting range information from the flash memory 142 in the course of recording the still picture, and processes the image in the acquired setting range. The image processor 122 then crops and records the processed image to the memory card 140 or another such recording medium.

As discussed above, in this embodiment, the user can simply set the diorama filter effect range from side to side and up and down (up, down, left, and right) merely by turning the setting dial 209 to the left or right, and therefore can capture moving pictures and still pictures according to the setting. Specifically, the setting operation is made more convenient in this embodiment.

Additional Aspects (1) The digital camera 100 can execute image processing on image information. The digital camera 100 comprises the CCD image sensor 120, the setting dial 209, the controller 130, and the image processor 122. The CCD image sensor 120 captures a subject image and outputs image information. The setting dial 209 accepts input from operation by a user and produces an operation signal. The controller 130 sets an object region that will be the object of diorama filtering, so that a region direction and/or a region range for setting the object region can be changed according to an operation signal corresponding to the operation direction of the setting dial 209. The image processor 122 performs diorama filtering on the object region on the basis of the region direction and the region range.

In the above configuration, the user can simply set the direction and range for applying the diorama filter effect merely by turning the setting dial 209 to the left or right. Also, since moving picture capture and/or still picture captures that match the setting is possible, the setting operation is more convenient.

(2) The direction for setting the object region of diorama processing (an example of the region direction) of digital camera 100, is set to either the up and down direction (an example of a first region direction) or the left and right direction (an example of a second region direction). In this case, the controller 130 changes the width of the object region in the up and down direction (or the left and right direction) when the setting dial 209 is operated continuously, after which it changes the width of the object region in the left and right direction (or the up and down direction) (a second region direction).

In the above configuration, the user can continuously change the range over which the diorama filter is applied (the object region) merely by turning the setting dial 209 to the left or right. As a result, the user can easily change to the desired diorama setting.

(3) The controller 130 of digital camera 100, changes the region direction setting of the object region of diorama processing at a specific timing when the setting dial 209 is operated continuously.

With this constitution, the user can automatically switch the direction in which the diorama filter is applied merely by continuous operation of the setting dial 209. For example, if the width of the object region has reached its maximum, the user can switch the direction for setting the object region of diorama processing merely by continuing to turn the setting dial 209.

Other Embodiments

The present technology is not limited to or by the above embodiments, and this disclosure enables numerous embodiments. Additional embodiments of the present technology are discussed below.

(A) The digital camera 100 of the first embodiment allowed setting of the direction in which the diorama filter was set (up and down or left and right) and the width of the range over which vignette processing was not applied, while the position of the range over which vignette processing was not applied was fixed. However, the constitution may be such that the user can freely specify this position. For instance, the constitution may be such that if the direction flag is "up/down," the position of the range over which vignette processing is not applied can be changed to the up and down direction. This position can be specified by operating the directional buttons 205 or the setting dial 209, for example. Also, this position can be specified with a touch panel.

(B) In the digital camera 100 of the first embodiment, filter effect setting processing was started by having the initial setting values as the up/down setting and the setting width at minimum. However, past setting range information may be stored instead. In this case, when the enter button 208 is pressed, that setting range information may be read and the setting started from that state. More specifically, when the enter button 208 is pressed, the controller 130 performs filter effect setting processing. The controller 130 here first reads the setting range information, that is, the direction flag and setting width value, from the flash memory 142. The setting frame is then displayed on the liquid crystal monitor 123 so that the setting frame is superposed on the through-image, on the basis of these values.

(C) In the digital camera 100 of the first embodiment, a setting frame indicating the filter effect range in filter effect setting processing was displayed as a rectangular frame surrounding the region in which vignette processing was not applied in the diorama filter. However, the setting frame may be displayed in some other way. For example, the boundary line between the regions in which vignette processing is applied and not applied in the diorama filter may simply be displayed.

(D) In the digital camera 100 of the first embodiment, the setting information (width and direction) may be initialized in any way, such as by pressing a certain button, in filter effect setting processing.

(E) In the digital camera 100 of the first embodiment, an example was described in which diorama filtering was performed on image information displayed (recorded) during through-image display, during still picture display, and during moving picture display. However, diorama filtering may be performed by the same setting operation as post-processing on image information that has already been recorded.

(F) In the digital camera 100 of the first embodiment, the setting operation was performed in processing for setting a diorama filter effect. However, the method for this setting operation may be applied to image processing or a filter other than a diorama filter. For example, the effect setting processing of the above embodiment may be applied in selecting the region in which to apply processing and the region in which not to apply processing as in FIG. 6, in edge enhancement, a color conversion filter, or the like.

(G) In the digital camera 100 of the first embodiment, processing for setting a diorama filter effect was performed by turning the setting dial 209, which was disposed on the rear face of the digital camera 100, to the left. The rotational axis of this setting dial 209 is in the forward and backward direction of the digital camera 100, but a dial whose rotational axis is in the up and down direction of the digital camera may be used instead of the setting dial 209. Also, a touch panel may be disposed on the liquid crystal monitor 123, and the setting operation performed from this liquid crystal monitor 123. For example, a circular object may be displayed on the liquid crystal monitor 123, and the user may trace this object with a finger to perform a setting operation according to the direction of this action (rotation to the right or to the left).

Figure 9:
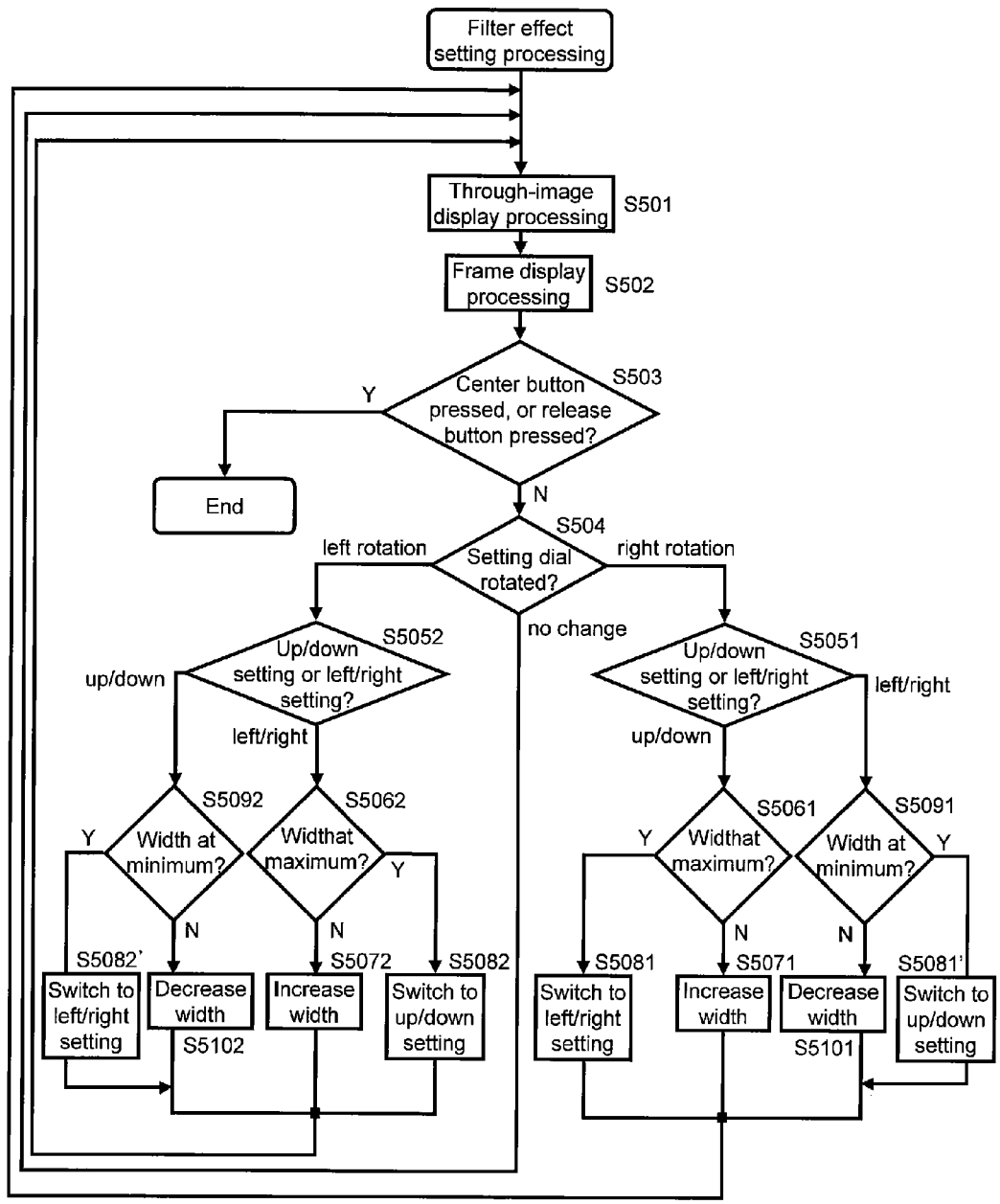
FIG. 9 is a flowchart of the flow of filter effect setting processing pertaining to another embodiment.

(H) In the digital camera 100 of the first embodiment, an example was given in which the screen of the liquid crystal monitor 123 was fixed at the screen 606 in FIG. 6 if the answer was Yes at S5091, and the screen of the liquid crystal monitor 123 was fixed at the screen 601 in FIG. 6 if the answer was Yes at S5092. Instead of this, as shown in FIG. 9, processing in which the direction of the filter effect range is switched to the up and down direction may be executed by the controller 130 (S5081') if the answer is Yes at S5091. Also, processing in which the direction of the filter effect range is switched to the left and right direction may be executed by the controller 130 (S5082) if the answer is Yes at S5092.

In this configuration, switching between the up and down direction and the left and right direction can be carried out seamlessly by the user by turning the setting dial 209. In other words, setting can be carried out smoothly. This makes the setting operation more convenient.

In FIG. 9, the portions other than S5081' and S5082' are the same as in the first embodiment, and will not be described again. In S503, the setting mode can be ended by using the center button 204 and the release button 201. Although ending the setting mode with the release button 201 was not clearly specified in the above embodiment, the setting mode may be ended by using the release button 201.

(I) The digital camera 100 of the first embodiment had a function to change the width of the setting frame (a frame width change function). The digital camera 100 in the first embodiment may also have a function to change the position of the setting frame (a frame position change function). The frame position change function is handled by the controller 130.

For example, when the setting dial 209 is operated in a direction other than the above-mentioned up and down direction and left and right direction of the digital camera 100 of the first embodiment, the controller 130 can change the position of the setting frame (an example of a region other than the object region). In this state, the controller 130 changes the position of the setting frame when the setting dial 209 is operated in the above-mentioned left and right direction and the left and right direction.

When the controller 130 detects that the setting dial 209 has been pressed, the controller 130 puts the frame width change function to sleep, and executes the frame position change function. When the controller 130 detects the rotation of the setting dial 209 is in a state in which the frame position change function is functioning, the controller 130 moves the setting frame according to the amount of the rotation.

Figure 10:
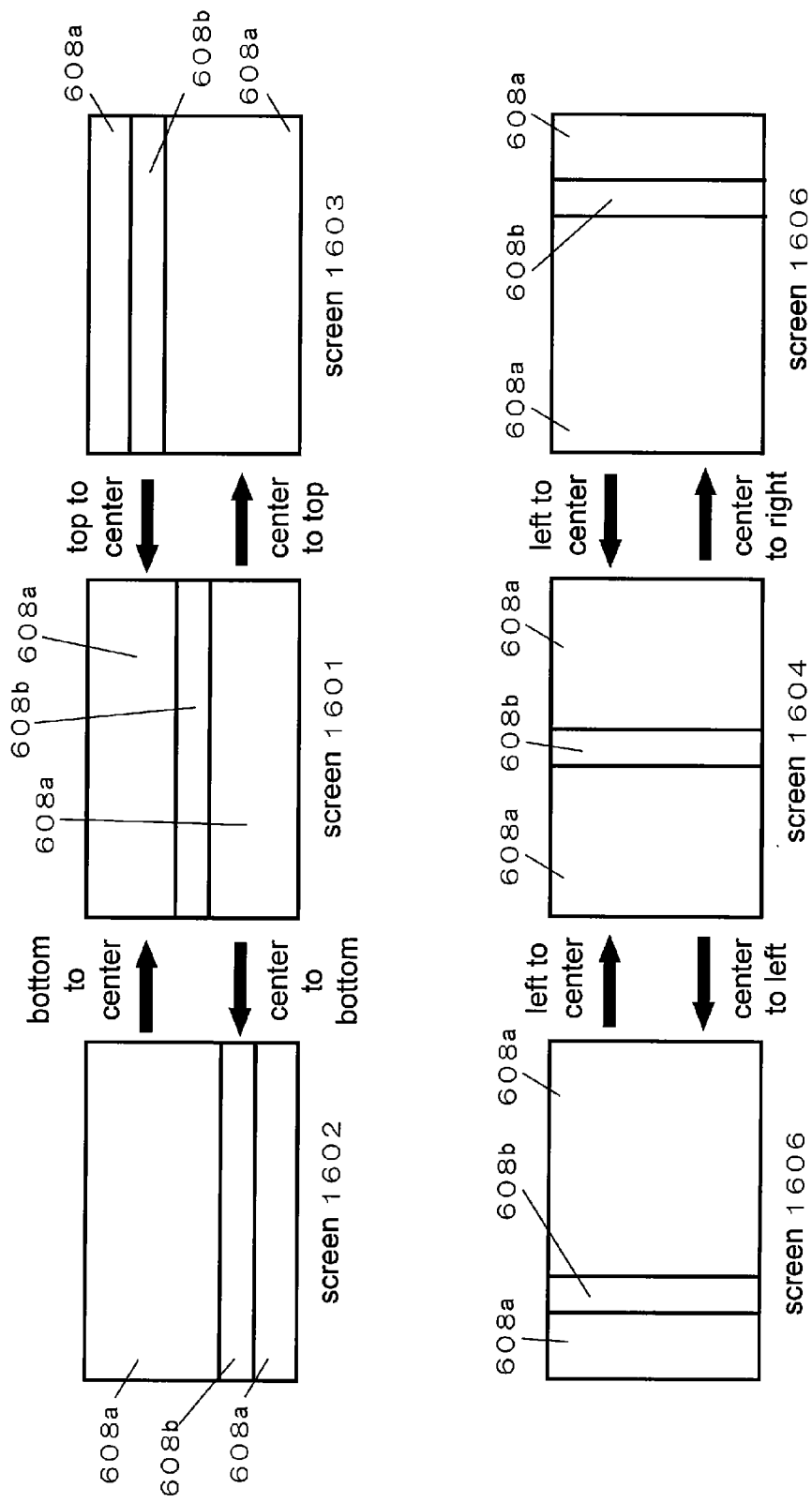
FIG. 10 is a diagram illustrating an example of the screen display during filter effect setting processing pertaining to another embodiment.

As shown in FIG. 10, if the setting dial 209 is rotated to the left (or to the right) when the diorama filter is set to the up and down direction, the setting frame moves upward (from the screen 1601 to the screen 1603), and when the setting dial 209 is rotated to the right (or to the left), the setting frame moves downward (from the screen 1601 to the screen 1602). Also, as shown in FIG. 10, if the setting dial 209 is rotated to the left (or to the right) when the diorama filter is set to the left and right direction, the setting frame moves to the left (from the screen 1604 to the screen 1606), and when the setting dial 209 is rotated to the right (or to the left), the setting frame moves to the right (from the screen 1604 to the screen 1605). The system returns to the frame width change function when the controller 130 again detects that the setting dial 209 has been pressed.

In this configuration, the user can easily dispose the setting frame where he or she wants it, merely by operating the setting dial 209. For example, the user can change the position of the setting frame merely by pressing the setting dial 209 and turning it to the left or right.

Figure 11:
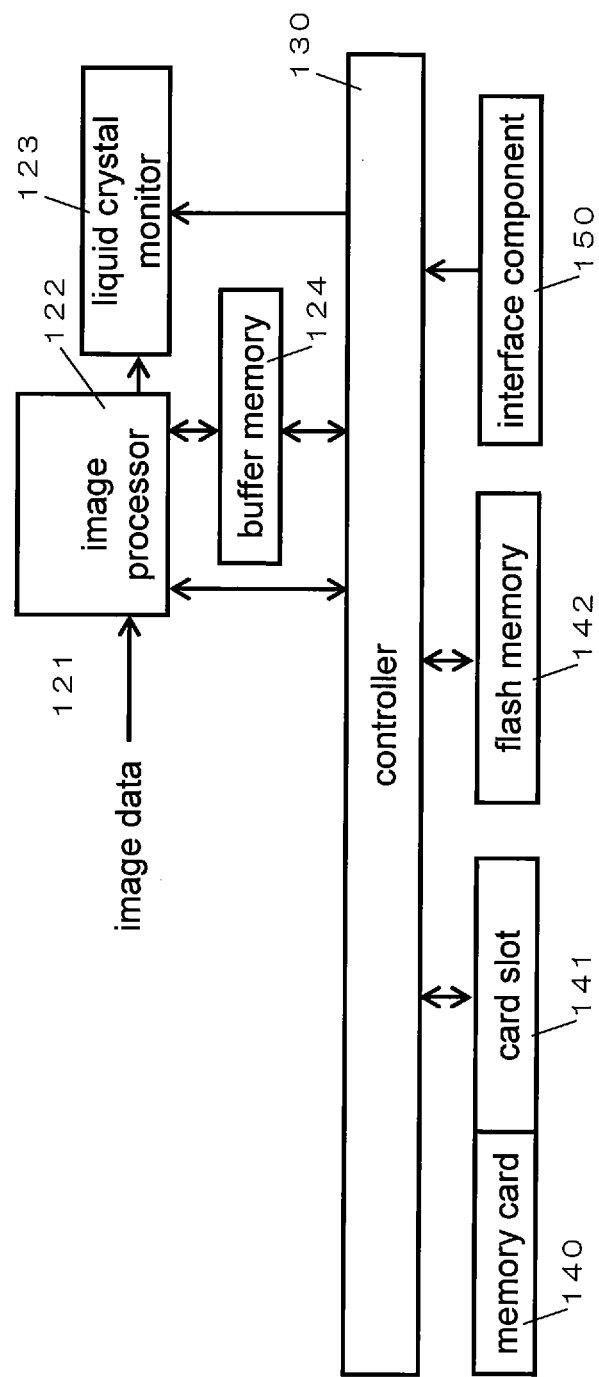
FIG. 11 is a diagram of the electrical configuration of the digital camera 100 pertaining to another embodiment.

(J) In the first embodiment, the digital camera 100 was described as an example, but this technology can also be applied to any other image processing device. For example, as shown in FIG. 11, the same effect as in the above embodiment can be obtained by processing image data with the image processor 122.

(K) In the digital camera 100 of the first embodiment, an example was given in which the width of the setting frame was changed in three stages in each direction, but the change in the width of the setting frame may be done in four or more stages, so long as there is more than one. The width of the setting frame may also be changed continuously, rather than non-continuously.

INDUSTRIAL APPLICABILITY

The present technology provides an imaging device for which the setting operation is more convenient, and can also be applied to a digital still camera, movie camera, portable telephone, or any other device that can record moving pictures or still pictures.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present technology should be interpreted relative to an imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment.

It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

What is claimed is:
1. An imaging device comprising:
   an image sensor configured to capture a subject image and output image information;
   a user interface configured to accept an user input operation and output a first operation signal, the first operation signal corresponding to a first operation direction of the interface component which indicates a particular direction;
   a controller programmed to set a first region as the object of a specific image process, the first region including a region direction and a region range of the first region, the controller also configured to change the region direction that determines a direction in which the dimensions of the first region are changed according to the first operation signal; and
   an image processor configured to perform the specific image process on the first region based on the region direction and the region range,
   the region direction being set to a first region direction or a second region direction that intersects the first region direction, and
   wherein when the user interface is continuously operated in the first operation direction, the controller changing the region range in the first region direction and after changing the first region direction, then changing the region range in the second region direction.

2. An imaging device comprising:

an image sensor configured to capture a subject image and output image information;

a user interface configured to accept a first input operation and output a first operation signal to a controller;

the controller programmed to set a first region as the object of a specific image process, the first region including a region direction and a region range of the first region, the controller also configured to change the region direction that determines a direction in which the dimensions of the first region are changed according to the first operation signal; the region direction being set to a first region direction or a second region direction that intersects the first region direction the controller programmed to determine a central area of an image, and to increase a first width of the central area to a maximum width vignetting a first adjacent area of the central area and a second adjacent area of the central area;

to decrease a second width of the central area to a minimum width vignetting a third adjacent area of the central area and a fourth adjacent area of the central area; wherein the second width lies in a different direction of the central area than the first width of the central area, and wherein when the user interface is continuously operated in the first operation direction, the controller changing the region range in the first region direction and after changing the first region direction, then changing the region range in the second region direction.

3. The imaging device of claim 2, wherein the first width is a horizontal width and the second width is a vertical width.

4. The imaging device of claim 2, wherein the first width is a vertical width and the second width is a horizontal width.

* * * * *